United States Patent
Luo et al.

(10) Patent No.: US 9,525,780 B2
(45) Date of Patent: Dec. 20, 2016

(54) METHOD AND SYSTEM FOR PROCESSING ABNORMALITY OF AS

(75) Inventors: Xujian Luo, Shenzhen (CN); Baoning Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 216 days.

(21) Appl. No.: 14/355,183

(22) PCT Filed: Apr. 28, 2012

(86) PCT No.: PCT/CN2012/074923
§ 371 (c)(1),
(2), (4) Date: Apr. 29, 2014

(87) PCT Pub. No.: WO2013/063910
PCT Pub. Date: May 10, 2013

(65) Prior Publication Data
US 2014/0302813 A1    Oct. 9, 2014

(30) Foreign Application Priority Data
Nov. 1, 2011 (CN) .......................... 2011 1 0340108
Dec. 16, 2011 (CN) .......................... 2011 1 0424316

(51) Int. Cl.
*H04M 15/00* (2006.01)
*H04L 12/14* (2006.01)
(Continued)

(52) U.S. Cl.
CPC .......... *H04M 15/57* (2013.01); *H04L 12/1403* (2013.01); *H04L 12/1485* (2013.01);
(Continued)

(58) Field of Classification Search
CPC ...... H04M 15/00; H04M 15/41; H04M 15/43; H04M 15/44; H04M 15/57; H04M 2215/0104; H04M 2215/208
See application file for complete search history.

(56) References Cited

U.S. PATENT DOCUMENTS

| | | | |
|---|---|---|---|
| 2010/0304710 A1* | 12/2010 | Sharma | H04M 15/00 455/406 |
| 2011/0061061 A1* | 3/2011 | Chen | H04L 63/08 719/313 |
| 2011/0258094 A1 | 10/2011 | Guo | |

FOREIGN PATENT DOCUMENTS

| | | |
|---|---|---|
| CN | 101777987 A | 7/2010 |
| CN | 101895915 A | 11/2010 |

(Continued)

OTHER PUBLICATIONS

International Search Report in international application No. PCT/CN2012/074923, mailed on Aug. 9, 2012.
(Continued)

*Primary Examiner* — Joseph Dean, Jr.
(74) *Attorney, Agent, or Firm* — Oppedahl Patent Law Firm LLC

(57) ABSTRACT

A method for processing an abnormality of an Application Server (AS) is disclosed. The method includes that: a Serving Call Session Control Function (SCSCF) sends an Accounting Request (ACR) message to a Charging Data Function (CDF), wherein the ACR message includes information of an abnormal AS; and after receiving the ACR message, the CDF fills a Charging Data Record (CDR) of the SCSCF with the information of the abnormal AS included in the ACR message. Correspondingly, a system for processing an abnormality of an AS is also disclosed. With the disclosure, a corresponding CDR including information of an abnormal AS can be generated in the case that there is an abnormality in the AS, thus enabling the accuracies of charging, operation and maintenance analysis and other associated processing to be improved.

18 Claims, 6 Drawing Sheets

(51) Int. Cl.
*H04L 29/06* (2006.01)
*H04L 12/24* (2006.01)
(52) U.S. Cl.
CPC ...... *H04L 65/1016* (2013.01); *H04L 65/1063* (2013.01); *H04M 15/41* (2013.01); *H04M 15/60* (2013.01); *H04M 15/62* (2013.01); *H04M 15/65* (2013.01); *H04L 41/0654* (2013.01)

(56) References Cited

FOREIGN PATENT DOCUMENTS

| | | |
|---|---|---|
| CN | 102075334 A | 5/2011 |
| EP | 2378709 A1 | 10/2011 |
| WO | 2007000688 A1 | 1/2007 |

OTHER PUBLICATIONS

English Translation of the Written Opinion of the International Search Authority in international application No. PCT/CN2012/074923, mailed on Aug. 9, 2012.
Add Abnormal Application Server field into S-CSCF CDR, S5-113589, mailed on Nov. 4, 2011.
Add Abnormal Application Server into IMS-Information, S5-113590, mailed on Nov. 4, 2011.
Add Abnormal Application Server field into S-CSCF CDR, S5-113591, mailed on Nov. 4, 2011.
Supplementary European Search Report in European application No. 12845830.4, mailed on Jun. 19, 2015.

* cited by examiner

METHOD AND SYSTEM FOR PROCESSING ABNORMALITY OF AS

TECHNICAL FIELD

The disclosure relates to the field of Internet Protocol (IP) Multimedia Subsystems (IMSs), and more particularly to a method and system for processing an abnormality of an Application Server (AS).

BACKGROUND

In a telecommunication network described by a $3^{rd}$ Generation Partnership Project (3GPP), a charging system is one of the important functional components of the telecommunication network and is an important guarantee for an operator to implement revenue. FIG. 1 is a connection diagram of charging functional entities in a 3GPP network, and the function of each charging functional entity as shown in FIG. 1 is described as follows.

A Charging Trigger Function (CTF) is embedded in each network element (including an access layer network element, a control layer network element and a service layer network element) of a 3GPP IMS to implement the following major functions: acquisition of charging information according to monitored use conditions of network resources and transmission of an Accounting Request (ACR) message to a Charging Data Function (CDF) through a Rf interface (Offline Charging Reference Point).

The major functions of the CDF are to receive the ACR message from the CTF, to construct the ACR message into a Charging Data Request (CDR), and to send the CDR to a Charging Gateway Function (CGF) through a Ga interface.

The major functions of the CGF are to store and manage the CDR received from the CDF and send a CDR file to a Billing Domain (BD) through a Bi interface.

FIG. 2 is a network architecture diagram of an IMS system (the figure only shows an example of an IMS network because the architecture of the IMS network is not limited to such architecture due to the diversity of actual User Equipments (UEs) and access equipments). As shown in FIG. 2, in a session of a user, signaling passes through network elements including a Proxy Call Session Control Function (PCSCF), a Serving Call Session Control Function (SCSCF), an Interrogating Call Session Control Function (ICSCF) and an AS. The CTF of each network element sends ACR[Start] when a session is started, sends ACR[Stop] when the session is ended, and triggers ACR[Interim] according to a Session Initiation Protocol (SIP) event during the session. The CDF opens a Charging Data Record (CDR) when having received the ACR[Start], updates the CDR when having received the ACR[Interim], and closes the CDR when having received the ACR[Stop].

In the CDR of each network element, a CDR of a PCSCF is from the PCSCF where a place visited by a user locates, and is generally applied to roaming settlement; a CDR of an A is from the AS subscribed by a user with rich charging information including specific service information, and is generally applied for user charging; and a CDR of an SCSCF is from the core control network element SCSCF of the IMS, and is generally applied to charging association or account checking etc.

In practical IMS network deployment, the aforementioned network elements are indispensable. A session of a user is generally performed through the aforementioned network elements. If there is an abnormality in a certain AS or there is an abnormality in a network connection between an SCSCF and a certain AS, the SCSCF will determine, according to configuration, to continue or end the session. If the session is continued, i.e., an abnormal AS is bypassed by the SCSCF, subsequent processing is continued to be performed. If the session is terminated, i.e., the SCSCF terminates a call request, session establishment fails.

FIG. 3 shows the condition that an SCSCF bypasses an AS. It is assumed that a UE (A) calls a UE (B), after there is an abnormality in an AS (A), an SCSCF (A) determines that there is a failure in the AS (A), and does not trigger an AS (A) service subscribed by a calling party. If there are other subscribed AS services, other AS services are triggered continuously, and then a calling request is sent to a called side network. After there is an abnormality in an AS (B), an SCSCF (B) determines that there is a failure in the AS (B), and does not trigger an AS (B) service subscribed by a called party. If there are other subscribed AS services, other AS services are triggered continuously, and then a calling request is sent to the SCSCF (B). Subsequent processing is performed in a similar manner.

It may be learned from the above analysis that, if a session is connected continuously in the case of an abnormality occurring to the AS, the possibility of an amount of service interruptions can be reduced greatly, thereby guaranteeing the call rights of a user to the highest degree and further improving the degree of satisfaction of the user. This is a solution which most operators are pleased to adopt. However, based on the prior art, since an abnormal AS fails to generate a corresponding CDR for a session in which a bypass is performed by an SCSCF in the case of the abnormality occurring to the AS, the session will not be charged if user charging is performed according to the CDR of the AS, thus resulting in inaccurate charging. In addition, the accuracy of subsequent processing including operation and maintenance analysis may be also reduced if the abnormality condition of the AS is not learned.

SUMMARY

In view of this, the disclosure is intended to provide a method and system for processing an abnormality of an AS, so as to improve the accuracies of charging, operation and maintenance analysis and other associated processing in the case of an abnormality occurring to an AS.

To this end, the technical solutions of the embodiments of the disclosure are implemented as follows.

A method for processing an abnormality of an AS includes:

a Serving Call Session Control Function (SCSCF) sends an Accounting Request (ACR) message to a Charging Data Function (CDF), wherein the ACR message at least includes information of an abnormal AS; and after the CDF receives the ACR message, the CDF fills a Charging Data Record (CDR) of the SCSCF with the information of the abnormal AS included in the ACR message.

The ACR message may include an Attribute Value Pair (AVP) configured to indicate the information of the abnormal AS.

The AVP may include a host name of the abnormal AS.

The ACR message may include an AVP configured to indicate information of a normal AS and the information of the abnormal AS.

The AVP may include a host name and a status of the normal AS and a host name and a status of the abnormal AS.

The process that the SCSCF sends the ACR message to the CDF may include but be not limited to one or more of the following:

when a session is started, the SCSCF continues the session and sends an ACR[Start] message to the CDF when the SCSCF determines that there is an abnormality in an AS subscribed by a user, wherein the ACR[Start] message includes the information of the abnormal AS;

when a session is started, the SCSCF terminates the session and sends an ACR[Event] message to the CDF when the SCSCF determines that there is an abnormality in the AS subscribed by the user, wherein the ACR[Event] message includes the information of the abnormal AS;

when a session is in progress, the SCSCF sends an ACR[Interim] message to the CDF when the SCSCF determines that there is an abnormality in the AS subscribed by the user, wherein the ACR[Interim] message includes the information of the abnormal AS; and when a session is terminated, the SCSCF sends an ACR[Stop] message to the CDF when the SCSCF determines that there is an abnormality in the AS subscribed by the user, wherein the ACR[Stop] message includes the information of the abnormal AS.

The method may further include that: a BD acquires the CDR of the SCSCF, and performs subsequent processing according to the information of the abnormal AS included in the CDR of the SCSCF.

The subsequent processing may include but be not limited to one or more of the following:

determining whether the abnormal AS is a network element that outputs a user CDR; if the abnormal AS is the network element that outputs the user CDR, applying the CDR of the SCSCF for user charging; and performing operation and maintenance analysis according to the information of the abnormal AS included in the CDR of the SCSCF.

A system for processing an abnormality of an AS may include: an SCSCF and a CDF, wherein the SCSCF is configured to send an ACR message to the CDF, wherein the ACR message at least includes information of an abnormal AS; and the CDF is configured to, after receiving the ACR message, fill a CDR of the SCSCF with the information of the abnormal AS included in the ACR message.

The ACR message may include an information of an AVP configured to indicate the information of the abnormal AS; or the ACR message may include an AVP configured to indicate information of a normal AS and the information of the abnormal AS.

The process that the SCSCF sends the ACR message to the CDF may include but be not limited to one or more of the following:

when a session is started, the SCSCF continues the session and sends an ACR[Start] message to the CDF when the SCSCF determines that there is an abnormality in an AS subscribed by a user, wherein the ACR[Start] message includes the information of the abnormal AS;

when a session is started, the SCSCF terminates the session and sends an ACR[Event] message to the CDF when the SCSCF determines that there is an abnormality in the AS subscribed by the user, wherein the ACR[Event] message includes the information of the abnormal AS;

when a session is in progress, the SCSCF sends an ACR[Interim] message to the CDF when the SCSCF determines that there is an abnormality in the AS subscribed by the user, wherein the ACR[Interim] message includes the information of the abnormal AS; and when a session is terminated, the SCSCF sends an ACR[Stop] message to the CDF when the SCSCF determines that there is an abnormality in the AS subscribed by the user, wherein the ACR[Stop] message includes the information of the abnormal AS.

The system may further includes a BD configured to acquire the CDR of the SCSCF and perform subsequent processing according to the information of the abnormal AS included in the CDR of the SCSCF.

The subsequent processing may includes but be not limited to one or more of the following:

determine whether the abnormal AS is a network element that outputs a user CDR; if the abnormal AS is the network element that outputs the user CDR, apply the CDR of the SCSCF for user charging; and perform operation and maintenance analysis according to the information of the abnormal AS included in the CDR of the SCSCF.

According to the method and system for processing an abnormality of an AS described in the embodiments of the disclosure, an SCSCF sends an ACR message including information of an abnormal AS to a CDF; and after receiving the ACR message, the CDF fills a CDR of the SCSCF with the information of the abnormal AS included in the ACR message. Through the solutions of the embodiments of the disclosure, a corresponding CDR including information of an abnormal AS can be generated in the case that there is an abnormality in the AS, thus enabling the accuracies of charging, operation and maintenance analysis and other associated processing to be improved.

BRIEF DESCRIPTION OF THE DRAWINGS

FIG. 3 is a schematic diagram illustrating a condition that an SCSCF bypasses an AS;

DETAILED DESCRIPTION

Directed at the problem of charging inaccuracy existing in the prior art, if a CDR of other network elements (such as an SCSCF) can be acquired to perform charging, charging loss can be reduced and operator revenue can be improved.

It should be noted that an SCSCF may also generate a CDR. Relevant specifications of an ACR have been defined by 3GPP TS32.299, and relevant specifications of a CDR of each network element have been defined by TS32.298. The problem is that related information of an AS abnormality is not recorded in the ACR and the CDR defined by the 3GPP, thus CDRs of an SCSCF generated when there is an abnormality in an AS and CDRs of the SCSCF generated when each AS is normal cannot be distinguished. Therefore, according to the present 3GPP specifications, a CDR of the SCSCF generated when there is an abnormality in an AS cannot be extracted to supplement charging.

In addition, when there is an abnormality in an AS and an SCSCF terminates a call, recording the information of the abnormal AS in a CDR of the SCSCF also helps to perform operation and maintenance processing including analysis of a reason for a call failure by a BD.

Based on the above consideration, the embodiments of the disclosure provide a method and system for processing an abnormality of an AS. The basic idea of the embodiments of the disclosure is that: an SCSCF sends an ACR message to a CDF, wherein the ACR message includes information of an abnormal AS; and after receiving the ACR message, the CDF fills a CDR of the SCSCF with the information of the abnormal AS included in the ACR message.

Figure 4:
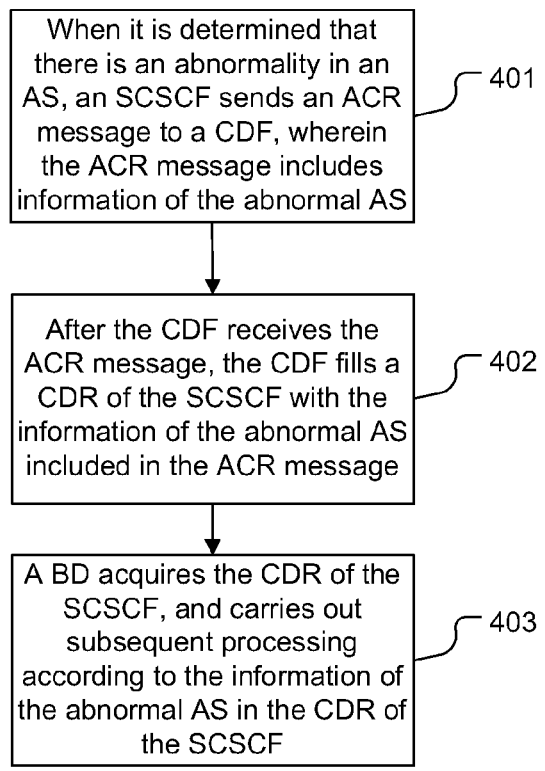
FIG. 4 is a flowchart of a method for processing an abnormality of an AS according to an embodiment of the disclosure.

FIG. 4 is a flowchart of a method for processing an abnormality of an AS according to an embodiment of the disclosure. As shown in FIG. 4, the method includes:

Step 401: When it is determined that there is an abnormality in an AS, an SCSCF sends an ACR message to a CDF, wherein the ACR message includes information of the abnormal AS.

Here, the ACR message may specifically include an Attribute Value Pair (AVP) configured to indicate the information of the abnormal AS (such as information including a host name of an abnormal AS), and the information of the abnormal AS included in the ACR message may be information of one abnormal AS, or may be also information of a plurality of abnormal ASs.

Alternatively, the ACR message may also include an AVP configured to indicate information of a normal AS and information of an abnormal AS. Specifically, the AVP includes a host name and a status of the normal AS and a host name and a status of the abnormal AS.

It should be noted that the process that the SCSCF sends the ACR message to the CDF includes but is not limited to one or more of the following:

when a session is started, the SCSCF continues the session and sends an ACR[Start] message to the CDF when the SCSCF determines that there is an abnormality in an AS subscribed by a user, wherein the ACR[Start] message includes the information of the abnormal AS;

when a session is started, the SCSCF terminates the session and sends an ACR[Event] message to the CDF when the SCSCF determines that there is an abnormality in the AS subscribed by the user, wherein the ACR[Event] message includes the information of the abnormal AS;

when a session is in progress, the SCSCF sends an ACR[Interim] message to the CDF when the SCSCF determines that there is an abnormality in the AS subscribed by the user, wherein the ACR[Interim] message includes the information of the abnormal AS; and when a session is terminated, the SCSCF sends an ACR[Stop] message to the CDF when the SCSCF determines that there is an abnormality in the AS subscribed by the user, wherein the ACR[Stop] message includes the information of the abnormal AS.

Step 402: After the CDF receives the ACR message, the CDF fills a CDR of the SCSCF with the information of the abnormal AS included in the ACR message.

Step 403: A BD acquires the CDR of the SCSCF, and carries out subsequent processing according to the information of the abnormal AS in the CDR of the SCSCF.

Here, the subsequent processing may include but be not limited to one or more of the following:

determining whether the abnormal AS is a network element that outputs a user CDR; if the abnormal AS is the network element that outputs the user CDR, applying the CDR of the SCSCF for user charging; and performing operation and maintenance analysis according to the information of the abnormal AS included in the CDR of the SCSCF.

Correspondingly, an embodiment of the disclosure also provides a system for processing an abnormality of an AS. The system includes: an SCSCF and a CDF, wherein the SCSCF is configured to send an ACR message to the CDF, wherein the ACR message at least includes information of an abnormal AS; and the CDF is configured to, after receiving the ACR message, fill a CDR of the SCSCF with the information of the abnormal AS included in the ACR message.

Inclusion of the information of the abnormal AS in the ACR message sent by the SCSCF refers to that: the ACR message includes an AVP configured to indicate the information of the abnormal AS (such as the host name of the abnormal AS), or the ACR message includes an AVP configured to indicate the information of the normal AS and the information of the abnormal AS.

The process that the SCSCF sends the ACR message to the CDF includes but is not limited to one or more of the following:

when a session is started, the SCSCF continues the session and sends an ACR[Start] message to the CDF when the SCSCF determines that there is an abnormality in an AS subscribed by a user, wherein the ACR[Start] message includes the information of the abnormal AS;

when a session is started, the SCSCF terminates the session and sends an ACR[Event] message to the CDF when the SCSCF determines that there is an abnormality in the AS subscribed by the user, wherein the ACR[Event] message includes the information of the abnormal AS;

when a session is in progress, the SCSCF sends an ACR[Interim] message to the CDF when the SCSCF determines that there is an abnormality in the AS subscribed by the user, wherein the ACR[Interim] message includes the information of the abnormal AS; and when a session is terminated, the SCSCF sends an ACR[Stop] message to the CDF when the SCSCF determines that there is an abnormality in the AS subscribed by the user, wherein the ACR[Stop] message includes the information of the abnormal AS.

The system further includes a BD configured to acquire the CDR of the SCSCF, and perform subsequent processing according to the information of the abnormal AS included in the CDR of the SCSCF.

The subsequent processing includes but is not limited to one or more of the following:

determine whether the abnormal AS is a network element that outputs a user CDR; if the abnormal AS is the network element that outputs the user CDR, apply the CDR of the SCSCF for user charging; and perform operation and maintenance analysis according to the information of the abnormal AS included in the CDR of the SCSCF.

Figure 1:
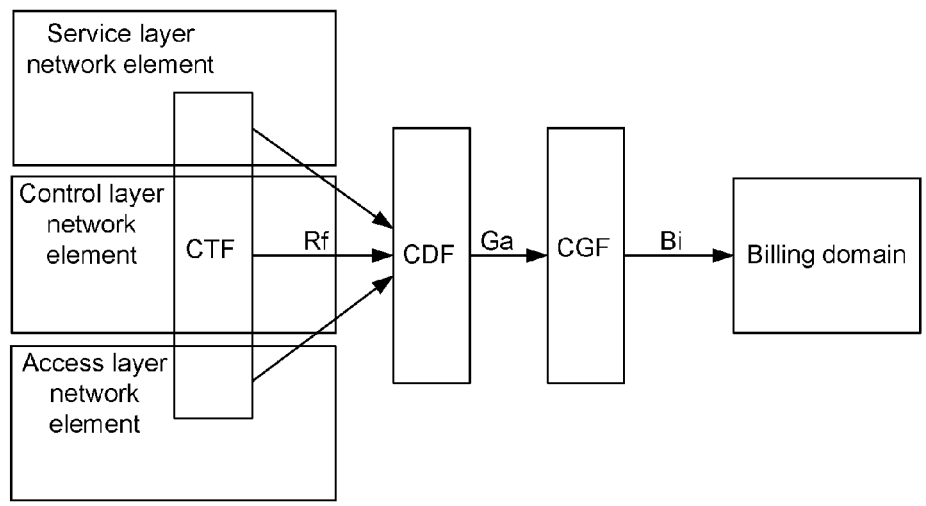
FIG. 1 is a connection diagram of charging functional entities in a 3GPP network.
Figure 2:
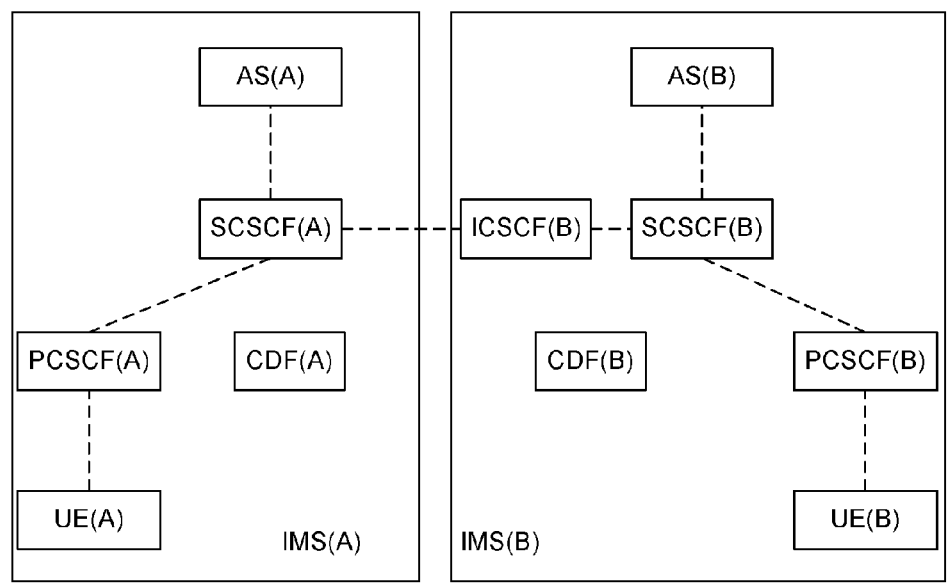
FIG. 2 is a network architecture diagram of an IMS system.
Figure 3:
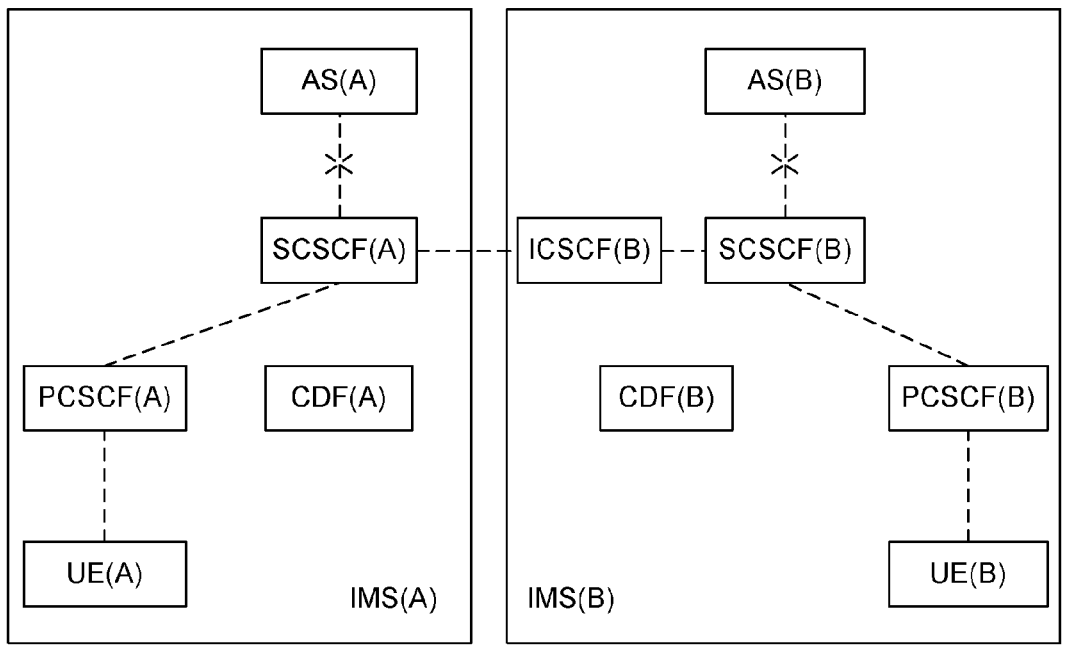

The technical solutions of the disclosure will be further elaborated below through specific embodiments and in combination with the network architecture as shown in FIG. 2.

Embodiment 1

When a session is started, there is an abnormality in a calling side AS and the session is continued.

Figure 5:
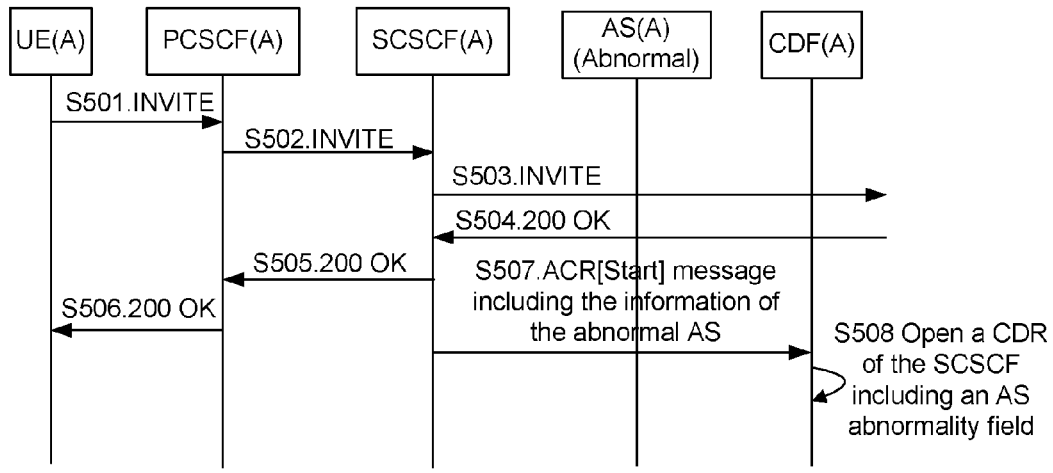
FIG. 5 is a flowchart of charging processing in the case that a session is continued when there is an abnormality in a calling side AS at the time of session initiation according to first and second embodiments of the disclosure.

FIG. 5 shows a flow of charging processing in the case that a session is continued when there is an abnormality in a calling side AS at the time of session initiation according to the first embodiment of the disclosure. The flow includes the following processing steps:

S501: UE A sends an INVITE request to a PCSCF.

S502: The PCSCF receives the INVITE request and sends the INVITE request to an SCSCF.

S503: The SCSCF receives the INVITE request, determines that there is an abnormality in a subscribed AS, and sends an INVITE message to a called side network element.

S504: The called side network element sends a 200 OK response to the SCSCF;

S505: The SCSCF sends a 200 OK message to the PCSCF.

S506: The PCSCF sends the 200 OK message to the UE A.

S507: The SCSCF sends to a CDF an ACR[Start] message including an Abnormal-Application-Server AVP that records a host name of an abnormal AS.

S508: The CDF receives the ACR[Start] message, opens a CDR of the SCSCF, and fills an abnormal AS list field with the host name of the abnormal AS.

It should be noted that there are also other SIP signaling interaction processes between S503 and S504 and these processes are omitted for simplification.

It should be noted that, in S507, the Abnormal-Application-Server AVP may appear repeatedly in one ACR and one AVP records a host name of one abnormal AS.

Embodiment 2

When a session is started, there is an abnormality in a calling side AS and the session is continued.

FIG. 2 shows a flow of charging processing in the case that a session is continued when there is an abnormality in a calling side AS at the time of session initiation according to the second embodiment of the disclosure. The flow includes the following processing steps:

S501: UE A sends an INVITE request to a PCSCF.

S502: The PCSCF receives the INVITE request and sends the INVITE request to an SCSCF.

S503: The SCSCF receives the INVITE request, determines that there is an abnormality in a subscribed AS, and sends an INVITE message to a called side network element.

S504: The called side network element sends a 200 OK response to the SCSCF;

S505: The SCSCF sends a 200 OK message to the PCSCF.

S506: The PCSCF sends the 200 OK message to the UE A.

S507: The SCSCF sends to a CDF an ACR[Start] message including status information of an abnormal AS. There are various specific implementation modes which are not limited here. For example, an existing Application-Server-Information AVP may include an Application-Server and an Abnormal-Status AVP, the Application-Server records a host name of an AS, and the Abnormal-Status corresponds to a certain abnormal AS record "AS abnormality". The Application-Server-Information AVP may also include an Application-Server and an Status AVP, the Application-Server records a host name of an AS, and Status corresponds to Normal or an error response code like 5xx (it may be determined thereby that the AS responds abnormally) which a status of each AS in response to an SIP event is and which is filled with by the AS recorded in the Application-Server. The Application-Server-Information AVP may also include an Application-Server and an Abnormal-Status AVP, the Application-Server records a host name of an AS, and the Abnormal-Status corresponds to a certain abnormal AS record "Time out" which represents response timeout. An AVP "AS-Response-Status" representing an AS response status may be also introduced into the ACR to directly correspond to an existing AS-Server-Information AVP to represent an response condition of each AS. In all, in order to mark an abnormal AS in the ACR, there may be various specific implementation modes which are not limited to the example illustrated in the embodiment.

S508: The CDF receives the ACR[Start] message, opens a CDR of the SCSCF and fills an AS list field with the information of the abnormal AS.

It should be noted that there are also other SIP signaling interaction processes between S503 and S504 and these processes are omitted for simplification.

It should be noted that, in S507, the Application-Server-Information AVP may appear repeatedly in one ACR and one AVP records combined information of a host name and a current status of one AS. An abnormal AS may be also identified by various specific other implementation modes, which are not limited to the example illustrated in the embodiment.

Embodiment 3

When a session is started, there is an abnormality in a called side AS and the session is continued.

Figure 6:
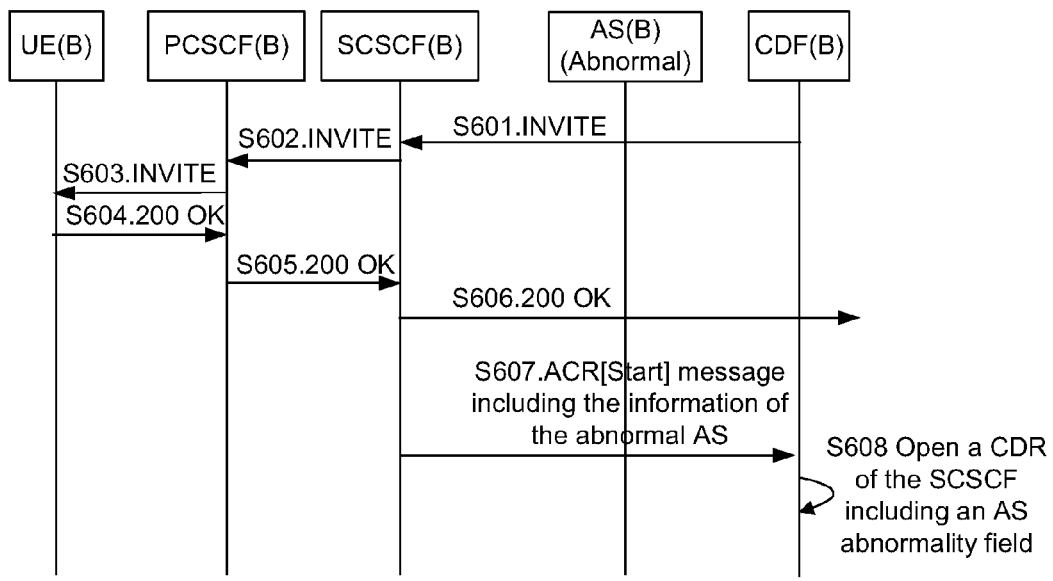
FIG. 6 is a flowchart of charging processing in the case that a session is continued when there is an abnormality in a called side AS at the time of session initiation according to third and fourth embodiments of the disclosure.

FIG. 6 shows a flow of charging processing in the case that a session is continued when there is an abnormality in a called side AS at the time of session initiation according to a third embodiment of the disclosure. The flow includes the following steps:

S601: An SCSCF receives an INVITE request from a called side.

S602: The SCSCF determines that there is an abnormality in an AS subscribed by a called user, and sends the INVITE request to a PCSCF.

S603: The PCSCF sends the INVITE request to a UE (B).

S604: The UE (B) sends a 200 OK message to the PCSCF.

S605: The PCSCF sends the 200 OK message to the SCSCF.

S606: The SCSCF sends the 200 OK message to the called side.

S607: The SCSCF sends to a CDF an ACR[Start] message including an Abnormal-Application-Server AVP that records a host name of an abnormal AS.

S608: The CDF receives the ACR[Start] message, opens a CDR of the SCSCF and fills an abnormal AS field with the host name of the abnormal AS.

It should be noted that there are also other SIP signaling interaction processes between S603 and S604 and these processes are omitted for simplification.

It should be noted that, in S607, the Abnormal-Application-Server AVP may appear repeatedly in one ACR and one AVP records a host name of one abnormal AS.

Embodiment 4

When a session is started, there is an abnormality in a called side AS and the session is continued.

FIG. 6 shows a flow of charging processing in the case that a session is continued when there is an abnormality in a called side AS at the time of session initiation according to a fourth embodiment of the disclosure. The flow includes the following steps:

S601: An SCSCF receives an INVITE request from a called side.

S602: The SCSCF determines that there is an abnormality in an AS subscribed by a called user, and sends the INVITE request to a PCSCF.

S603: The PCSCF sends the INVITE request to a UE (B).

S604: The UE (B) sends a 200 OK message to the PCSCF.

S605: The PCSCF sends the 200 OK message to the SCSCF.

S606: The SCSCF sends the 200 OK message to the called side.

S607: The SCSCF sends to a CDF an ACR[Start] message, an Application-Server-Information AVP includes an Application-Server and n Abnormal-Status AVP, the Application-Server records a host name of an AS, and the Abnormal-Status records an "an AS abnormality".

S608: The CDF receives the ACR[Start] message, opens a CDR of the SCSCF and fills an AS information list field with the information of the abnormal AS.

It should be noted that there are also other SIP signaling interaction processes between S603 and S604 and these processes are omitted for simplification.

It should be noted that, in S607, the Application-Server-Information AVP may appear repeatedly in one ACR and one AVP records combined information of a host name and a current status of an AS.

It should be noted that S607 in the embodiment may apply the specific implementation modes described in S507.

Embodiment 5

During a session, there is an abnormality in a calling side AS.

Figure 7:
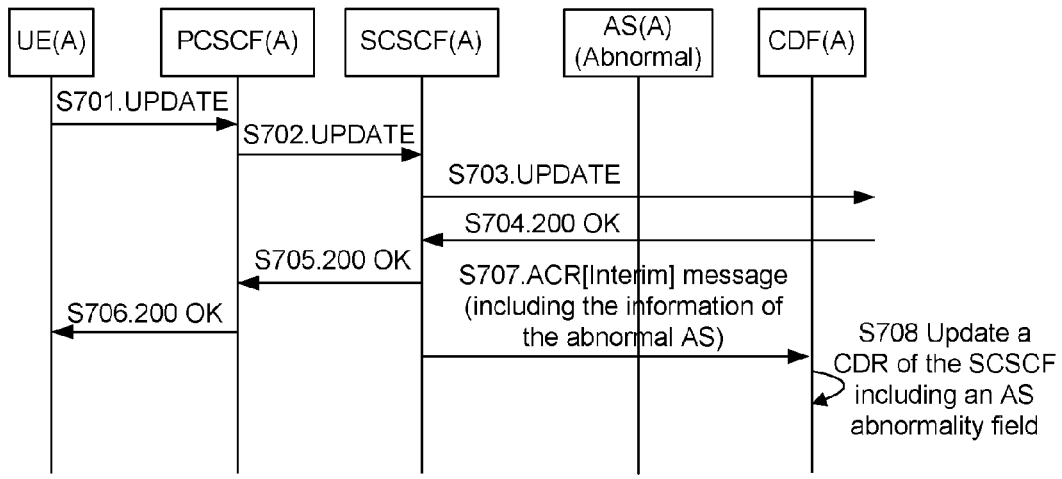
FIG. 7 is a flowchart of charging processing in the case that there is an abnormality in a calling side AS in a session according to fifth and sixth embodiments of the disclosure.

FIG. 7 shows a flow of charging processing in the case that there is an abnormality in a calling side AS in a session in the fifth embodiment of the disclosure. The flow includes the following steps:

S701: A UE (A) sends an UPDATE request to a PCSCF.

S702: The PCSCF receives the UPDATE request and sends the UPDATE request to an SCSCF.

S703: The SCSCF receives the UPDATE request, determines that there is an abnormality in a subscribed AS, and sends an UPDATE message to a called side network element.

S704: The called side network element sends a 200 OK response to the SCSCF.

S705: The SCSCF sends a 200 OK message to the PCSCF.

S706: The PCSCF sends the 200 OK message to the UE (A).

S707: The SCSCF sends to a CDF an ACR[Interim] message including an Abnormal-Application-Server AVP that records a host name of an abnormal AS.

S708: The CDF receives the ACR[Interim] message, updates a CDR of the SCSCF. If there is not the host name of the abnormal AS in an abnormal AS field in a CDR, the host name of the abnormal AS is added into the abnormal AS field.

It should be noted that there are many SIP methods for triggering an ACR[Interim] message and UPDATE is illustrated as an example here. All SIP methods for triggering an ACR[Interim] message are applicable to the disclosure.

It should be noted that there are also other SIP signaling interaction processes between S703 and S704, and the processes are omitted for simplification.

It should be noted that, in S707, the Abnormal-Application-Server AVP may appear repeatedly in one ACR and one AVP records a host name of one abnormal AS.

Embodiment 6

During a session, there is an abnormality in a calling side AS.

FIG. 7 shows a flow of charging processing in the case that there is an abnormality in a calling side AS in a session in the sixth embodiment of the disclosure. The flow includes the following steps:

S701: A UE (A) sends an UPDATE request to a PCSCF.

S702: The PCSCF receives the UPDATE request and sends the UPDATE request to an SCSCF.

S703: The SCSCF receives the UPDATE request, determines that there is an abnormality in a subscribed AS, and sends an UPDATE message to a called side network element.

S704: The called side network element sends a 200 OK response to the SCSCF.

S705: The SCSCF sends a 200 OK message to the PCSCF.

S706: The PCSCF sends the 200 OK message to the UE (A).

S707: The SCSCF sends to a CDF an ACR[Interim] message, an Application-Server-Information AVP includes an Application-Server and an Abnormal-Status AVP, and the Application-Server records a host name of an AS and the Abnormal-Status records an "AS abnormality".

S708: The CDF receives the ACR[Interim] message, updates a CDR of the SCSCF, and updates the information of the abnormal AS to an AS information list field.

It should be noted that there are many SIP methods for triggering an ACR[Interim] message and UPDATE is illustrated as an example here. All SIP methods for triggering an ACR[Interim] message are applicable to the disclosure.

It should be noted that there are also other SIP signaling interaction processes between S703 and S704 and these processes are omitted for simplification.

It should be noted that, in S707, the Application-Server-Information may appear repeatedly in one ACR and one AVP records combined information of a host name and a current status of one AS.

It should be noted that S707 in the embodiment may apply the specific implementation modes described in S507.

Embodiment 7

During a session, there is an abnormality in a called side AS.

Figure 8:
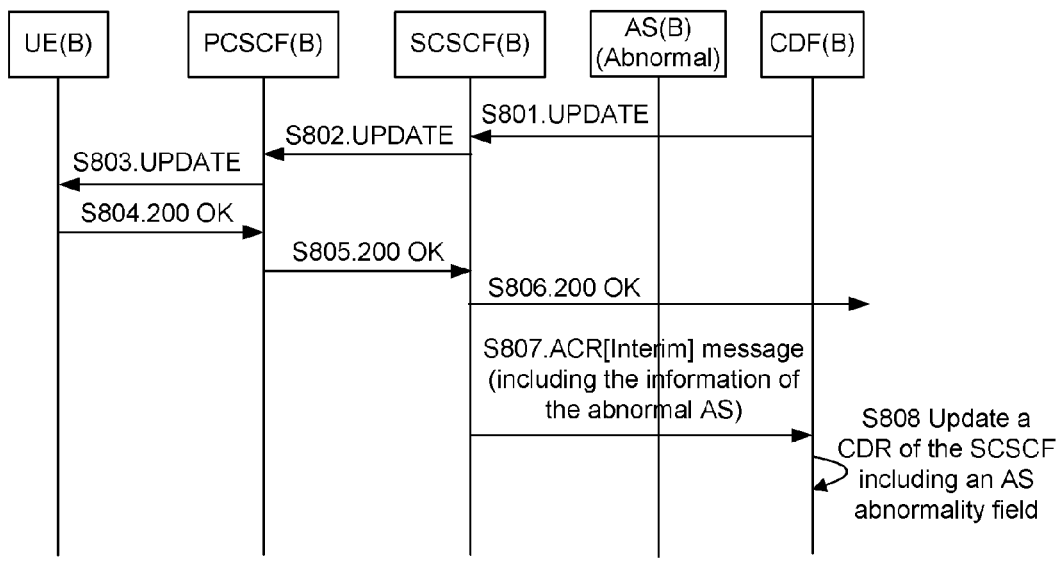
FIG. 8 is a flowchart of charging processing in the case that there is an abnormality in a called side AS in a session according to seventh and eighth embodiments of the disclosure.

FIG. 8 shows a flow of charging processing in the case that there is an abnormality in a called side AS in a session in the seventh embodiment of the disclosure. The flow includes the following processing steps:

S801: An SCSCF receives an UPDATE request from a called side.

S802: The SCSCF determines that there is an abnormality in an AS subscribed by a called user, and sends the UPDATE request to a PCSCF.

S803: The PCSCF sends a UPDATE request to a UE (B).

S804: The UE (B) sends a 200 OK message to the PCSCF.

S805: The PCSCF sends the 200 OK message to the SCSCF.

S806: The SCSCF sends the 200 OK message to the called side.

S807: The SCSCF sends to a CDF an ACR[Interim] message including an Abnormal-Application-Server AVP that records a host name of an abnormal AS.

S808: The CDF receives the ACR[Interim] message, updates a CDR of the SCSCF. If there is not the host name of the abnormal AS in an abnormal AS field in a CDR, the host name of the abnormal AS is added into the abnormal AS field.

It should be noted that there are many SIP methods for triggering an ACR[Interim] message and UPDATE is illustrated as an example here. All SIP methods for triggering an ACR[Interim] message are applicable to the disclosure.

It should be noted that there are also other SIP signaling interaction processes between S803 and S804 and these processes are omitted for simplification.

It should be noted that, in S807, the Abnormal-Application-Server AVP may appear repeatedly in one ACR and one AVP records a host name of one abnormal AS.

Embodiment 8

During a session, there is an abnormality in a called side AS.

FIG. 8 shows a flow of charging processing in the case that there is an abnormality in a called side AS in a session in the eighth embodiment of the disclosure. The flow includes the following processing steps:

S801: An SCSCF receives an UPDATE request from a called side.

S802: The SCSCF determines that there is an abnormality in an AS subscribed by a called user, and sends the UPDATE request to a PCSCF.

S803: The PCSCF sends the UPDATE request to a UE (B).

S804: The UE (B) sends a 200 OK message to the PCSCF.

S805: The PCSCF sends the 200 OK message to the SCSCF.

S806: The SCSCF sends the 200 OK message to the called side.

S807: The SCSCF sends to a CDF an ACR[Interim] message, an Application-Server-Information AVP includes an Application-Server and an Abnormal-Status AVP, and the Application-Server records a host name of an AS and the Abnormal-Status records an "AS abnormality".

S808: The CDF receives the ACR[Interim] message, updates a CDR of the SCSCF, and updates the information of the abnormal AS to an AS information list field.

It should be noted that there are many SIP methods for triggering an ACR[Interim] message and UPDATE is illustrated as an example here. All SIP methods for triggering an ACR[Interim] message are applicable to the disclosure.

It should be noted that there are also other SIP signaling interaction processes between S803 and S804 and these processes are omitted for simplification.

It should be noted that, in S807, the Application-Server-Information AVP may appear repeatedly in one ACR and one AVP records combined information of a host name and a current status of one AS.

It should be noted that S807 in the embodiment may apply the specific implementation modes described in S507.

Embodiment 9

When a session is terminated, there is an abnormality in a calling side AS.

Figure 9:
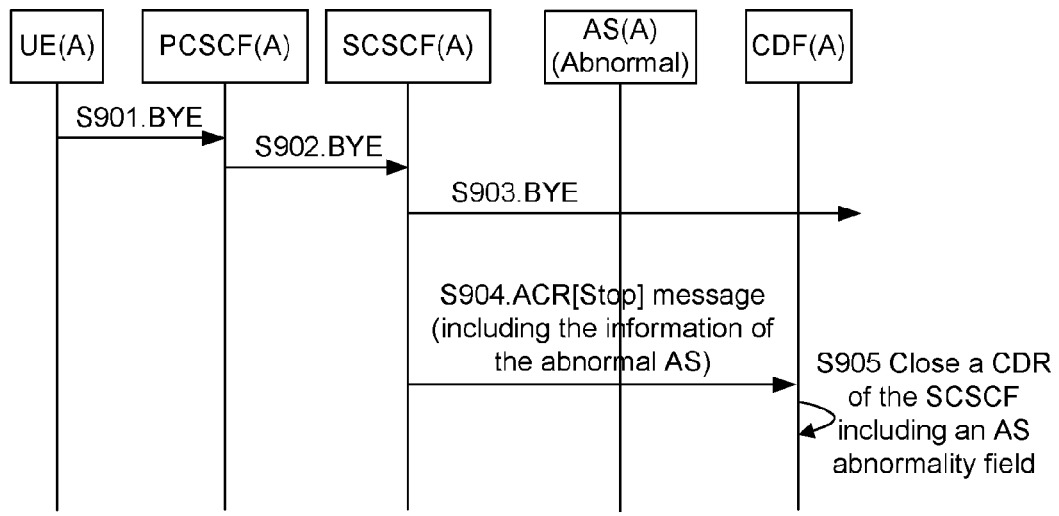
FIG. 9 is a flowchart of charging processing in the case that there is an abnormality in a calling side AS at the time of session termination according to ninth and tenth embodiments of the disclosure.

FIG. 9 shows a flow of charging processing in the case that there is an abnormality in a calling side AS at the time of session termination in the ninth embodiment of the disclosure. The flow includes the following processing steps:

S901: A UE (A) sends a BYE request to a PCSCF.

S902: The PCSCF receives the BYE request and sends the BYE request to an SCSCF.

S903: The SCSCF receives the BYE request, determines that there is an abnormality in a subscribed AS, and sends a BYE message to a called side network element.

S904: The SCSCF sends to a CDF an ACR[Stop] message including an Abnormal-Application-Server AVP that records a host name of an abnormal AS.

S905: The CDF receives the ACR[Stop] message, closes a CDR of the SCSCF.

If there is not the host name of the abnormal AS in an abnormal AS field in a CDR, the host name of the abnormal AS is added into the abnormal AS field.

It should be noted that there are many SIP methods for triggering an ACR[Stop] message and BYE is illustrated as an example here. All SIP methods for triggering an ACR [Stop] message are applicable to the disclosure.

It should be noted that, in S904, the Abnormal-Application-Server AVP may appear repeatedly in one ACR and one AVP records a host name of one abnormal AS.

Embodiment 10

When a session is terminated, there is an abnormality in a calling side AS.

FIG. 9 shows a flow of charging processing in the case that there is an abnormality in a calling side AS at the time of session termination in the tenth embodiment of the disclosure. The flow includes the following processing steps:

S901: A UE (A) sends a BYE request to a PCSCF.

S902: The PCSCF receives the BYE request and sends the BYE request to an SCSCF.

S903: The SCSCF receives the BYE request, determines that there is an abnormality in a subscribed AS, and sends a BYE message to a called side network element.

S904: The SCSCF sends to a CDF an ACR[Stop] message, an Application-Server-Information AVP includes an Application-Server and an Abnormal-Status AVP, and the Application-Server records a host name of an AS and the Abnormal-Status records an "AS abnormality".

S905: The CDF receives the ACR[Stop] message, closes a CDR of the SCSCF, and updates the information of the abnormal AS to an AS information list field.

It should be noted that there are many SIP methods for triggering an ACR[Stop] message and BYE is illustrated as an example here. All SIP methods for triggering an ACR[Stop] message are applicable to the disclosure.

It should be noted that, in S904, the Application-Server-Information AVP may appear repeatedly in one ACR and one AVP records combined information of a host name and a current status of one AS.

It should be noted that S904 in the embodiment may apply the specific implementation modes described in S507.

Embodiment 11

When a session is terminated, there is an abnormality in a called side AS.

Figure 10:
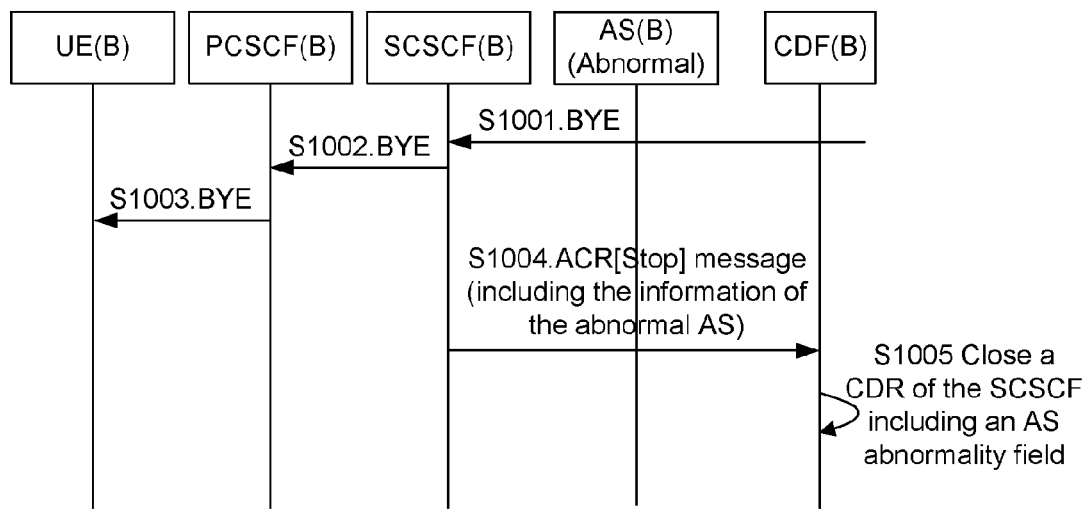
FIG. 10 is a flowchart of charging processing in the case that there is an abnormality in a called side AS at the time of session termination according to eleventh and twelfth embodiments of the disclosure.

FIG. 10 shows a flow of charging processing in the case that there is an abnormality in a called side AS at the time of session termination in the eleventh embodiment of the disclosure. The flow includes the following processing steps:

S1001: An SCSCF receives a BYE request from a called side.

S1002: The SCSCF determines that there is an abnormality in an AS subscribed by a called user, and sends the BYE request to a PCSCF.

S1003: The PCSCF sends the BYE request to a UE (B).

S1004: The SCSCF sends to a CDF an ACR[Stop] message including an Abnormal-Application-Server AVP that records a host name of an abnormal AS.

S1005: The CDF receives the ACR[Stop] message, closes a CDR of the SCSCF. If there is not the host name of the abnormal AS in an abnormal AS field in a CDR, the host name of the abnormal AS is added into the abnormal AS field.

It should be noted that there are many SIP methods for triggering an ACR[Stop] message and BYE is illustrated as an example here. All SIP methods for triggering an ACR[Stop] message are applicable to the disclosure.

It should be noted that, in S1004, the Abnormal-Application-Server AVP may appear repeatedly in one ACR and one AVP records a host name of one abnormal AS.

Embodiment 12

When a session is terminated, there is an abnormality in a called side AS.

FIG. 10 shows a flow of charging processing in the case that there is an abnormality in a called side AS at the time of session termination in the twelfth embodiment of the disclosure. The flow includes the following processing steps:

S1001: An SCSCF receives a BYE request from a called side.

S1002: The SCSCF determines that there is an abnormality in an AS subscribed by a called user, and sends the BYE request to a PCSCF.

S1003: The PCSCF sends the BYE request to a UE (B).

S1004: The SCSCF sends to a CDF an ACR[Stop] message, an Application-Server-Information AVP includes an Application-Server and an Abnormal-Status AVP, and the Application-Server records a host name of an AS and the Abnormal-Status records an "AS abnormality".

S1005: The CDF receives the ACR[Stop] message, closes a CDR of the SCSCF and updates the information of the abnormal AS to an AS information list field.

It should be noted that there are many SIP methods for triggering an ACR[Stop] message and BYE is illustrated here as an example. All SIP methods for triggering an ACR[Stop] message are applicable to the disclosure.

It should be noted that, in S1004, the Application-Server-Information AVP may appear repeatedly in one ACR and one AVP records information of a host name and a current status of one AS.

It should be noted that S1004 in the embodiment may apply the specific implementation modes described in S507.

Embodiment 13

When a session is started, there is an abnormality in a calling side AS and the session is terminated.

Figure 11:
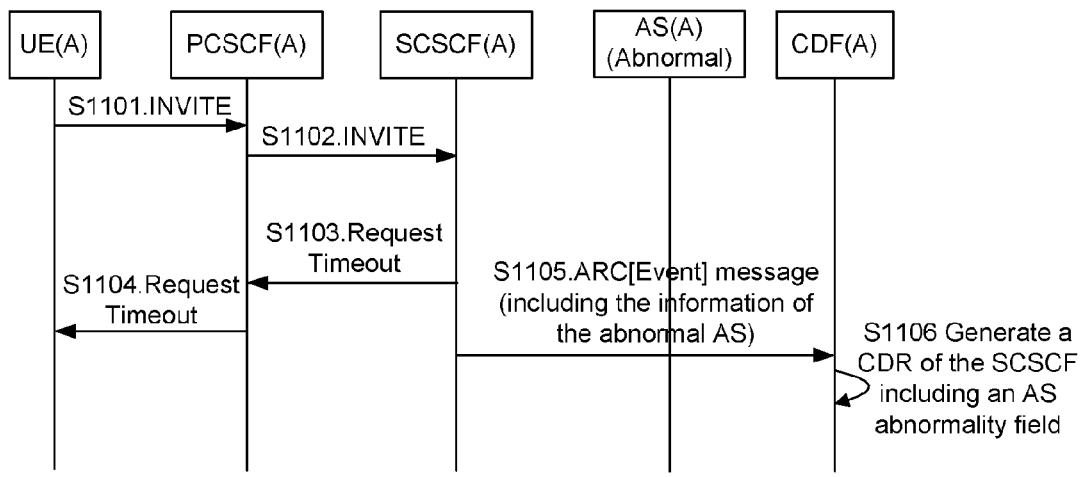
FIG. 11 is a flowchart of charging processing in the case that a session is terminated when there is an abnormality in a calling side AS at the time of session initiation according to thirteenth and fourteenth embodiments of the disclosure.

FIG. 11 shows a flow of charging processing in the case that there is an abnormality in a calling side AS at the time of session initiation according to the thirteenth embodiment of the disclosure. The flow includes the following processing steps:

S1101: UE A sends an INVITE request to a PCSCF.

S1102: The PCSCF receives the INVITE request and sends the INVITE request to an SCSCF.

S1103: The SCSCF receives the INVITE request, determines that there is an abnormality (such as no response) in a subscribed AS, and sends a 408 (Request Timeout) response to the PCSCF.

S1104: The PCSCF sends a 408 response message to the UE A.

S1105: The SCSCF sends to a CDF an ACR[Event] message including an Abnormal-Application-Server AVP that records a host name of an abnormal AS.

S1106: The CDF receives the ACR[Event] message, generates a CDR of the SCSCF, and fills an abnormal AS list field with the host name of the abnormal AS.

It should be noted that, in S1103, an AS without a response is illustrated as an example and other conditions are also applicable to the disclosure. If an AS returns a 5xx abnormality message, the SCSCF sends a 5xx response to the PCSCF.

It should be noted that, in S1105, the Abnormal-Application-Server AVP may appear repeatedly in one ACR and one AVP records a host name of one abnormal AS.

Embodiment 14

When a session is started, there is an abnormality in a calling side AS and the session is terminated.

FIG. 11 is a flow of charging processing in the case that there is an abnormality in a calling side AS at the time of session initiation according to the fourteenth embodiment of the disclosure. The flow includes the following processing steps:

S1101: UE A sends an INVITE request to a PCSCF.

S1102: The PCSCF receives the INVITE request and sends the INVITE request to an SCSCF.

S1103: The SCSCF receives the INVITE request, determines that there is an abnormality (such as no response) in a subscribed AS, and sends a 408 (Request Timeout) response to the PCSCF.

S1104: The PCSCF sends a 408 response message to the UE A.

S1105: The SCSCF sends to a CDF an ACR[Event] message, an Application-Server-Information AVP includes an Application-Server and an Abnormal-Status AVP, and the Application-Server records a host name of an AS and the Abnormal-Status records an "AS abnormality".

S1106: The CDF receives the ACR[Event] message, generates a CDR of the SCSCF, and fills an AS information list field with the information of the abnormal AS.

It should be noted that, in S1103, an AS without a response is illustrated for example and other conditions are also applicable to the disclosure. If an AS returns a 5xx abnormality message, the SCSCF sends a 5xx response to the PCSCF.

It should be noted that, in S1105, the Application-Server-Information AVP may appear repeatedly in one ACR and one AVP records combined information of a host name and a current status of one AS.

It should be noted that S1105 in the embodiment may apply the specific implementation modes described in S507.

Embodiment 15

When a session is started, there is an abnormality in a called side AS and the session is terminated.

Figure 12:
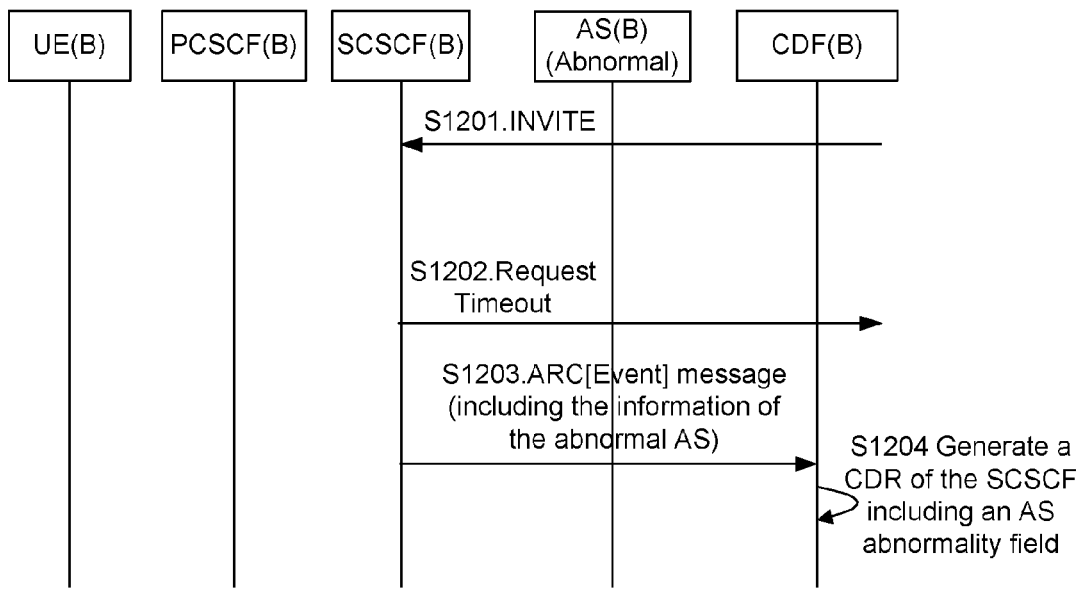
FIG. 12 is a flowchart of charging processing in the case that a session is terminated when there is an abnormality in a called side AS at the time of session initiation according to fifteenth and sixteenth embodiments of the disclosure.

FIG. 12 shows a flow of charging processing in the case that a session is terminated when there is an abnormality in a called side AS at the time of session initiation according to the fifteenth embodiment of the disclosure. The flow includes the following processing steps:

S1201: An SCSCF receives an INVITE request from a called side.

S1202: The SCSCF determines that there is an abnormality (such as no response) in an AS subscribed by a user, and sends 408 (Request Timeout) to the called side.

S1203: The SCSCF sends to a CDF an ACR[Event] message including an Abnormal-Application-Server AVP that records a host name of an abnormal AS.

S1204: The CDF receives the ACR[Event] message, generates a CDR of the SCSCF, and fills an abnormal AS field with the host name of the abnormal AS.

It should be noted that, in S1202, an AS without a response is illustrated for example and other conditions are also applicable to the disclosure. If an AS returns a 5xx abnormality message, the SCSCF sends a 5xx response to the called side.

It should be noted that, in S1203, the Abnormal-Application-Server AVP may appear repeatedly in one ACR and one AVP records a host name of one abnormal AS.

Embodiment 16

When a session is started, there is an abnormality in a called side AS and the session is terminated.

FIG. 12 shows a flow of charging processing in the case that a session is terminated when there is an abnormality in a called side AS at the time of session initiation according to the sixteenth embodiment of the disclosure. The flow includes the following processing steps:

S1201: An SCSCF receives an INVITE request from a called side.

S1202: The SCSCF determines that there is an abnormality (such as no response) in an AS subscribed by a user, and sends 408 (Request Timeout) to the called side.

S1203: The SCSCF sends to a CDF an ACR[Event] message, an Application-Server-Information AVP includes an Application-Server and an Abnormal-Status AVP, and the Application-Server records a host name of an AS and the Abnormal-Status records an "AS abnormality".

S1204: The CDF receives the ACR[Event] message, generates a CDR of the SCSCF, and fills an AS information list field with the information of the abnormal AS.

It should be noted that, in S1202, an AS without a response is illustrated for example and other conditions are also applicable to the disclosure. If an AS returns a 5xx abnormality message, the SCSCF sends a 5xx response to the called side.

It should be noted that, in S1203, the Application-Server-Information AVP may appear repeatedly in one ACR and one AVP records combined information of a host name and a current status of one AS.

It should be noted that S1203 in the embodiment may apply the specific implementation modes described in S507.

From the above, by means of the disclosure, the information of the abnormal AS may be provided in a CDR of an SCSCF when there is an abnormality in an AS. When the SCSCF continues a session, A BD may extract the CDR of the SCSCF including the information for user charging, thus reducing charging loss and improving operator revenue. When the SCSCF does not continue the session, the BD may perform analysis processing according to the abnormality information in the CDR of the SCSCF.

The above are only the preferred embodiments of the disclosure, and are not intended to limit the scope of protection of the claims of the disclosure.

The invention claimed is:

1. A method for processing an abnormality of an Application Server (AS), comprising:
   sending, by a Serving Call Session Control Function (SCSCF), an Accounting Request (ACR) message to a Charging Data Function (CDF), wherein the ACR message includes an Attribute Value Pair (AVP) configured to indicate information of an abnormal AS; and
   after the CDF receives the ACR message, filling, by the CDF, a Charging Data Record (CDR) of the SCSCF with the information of the abnormal AS.

2. The method according to claim 1, wherein the AVP includes a host name of the abnormal AS.

3. The method according to claim 2 further comprising: acquiring, by a Billing Domain (BD), the CDR of the SCSCF, and performing subsequent processing according to the information of the abnormal AS included in the CDR of the SCSCF.

4. The method according to claim 1, wherein the AVP is further configured to indicate information of a normal AS.

5. The method according to claim 4, further comprising: acquiring, by a Billing Domain (BD), the CDR of the SCSCF, and performing subsequent processing according to the information of the abnormal AS included in the CDR of the SCSCF.

6. The method according to claim 4, wherein the AVP includes a host name and a status of the normal AS and a host name and a status of the abnormal AS.

7. The method according to claim 6, further comprising: acquiring, by a Billing Domain (BD), the CDR of the SCSCF, and performing subsequent processing according to the information of the abnormal AS included in the CDR of the SCSCF.

8. The method according to claim 1, wherein the step of sending, by the SCSCF, the ACR message to the CDF comprises one or more of the following:
   when a session is started, the SCSCF continues the session and sends an ACR[Start] message to the CDF when the SCSCF determines that there is an abnormality in an AS subscribed by a user, wherein the ACR [Start] message includes the information of the abnormal AS;

when a session is started, the SCSCF terminates the session and sends an ACR[Event] message to the CDF when the SCSCF determines that there is an abnormality in the AS subscribed by the user, wherein the ACR[Event] message includes the information of the abnormal AS;

when a session is in progress, the SCSCF sends an ACR[Interim] message to the CDF when the SCSCF determines that there is an abnormality in the AS subscribed by the user, wherein the ACR[Interim] message includes the information of the abnormal AS; and when a session is terminated, the SCSCF sends an ACR [Stop] message to the CDF when the SCSCF determines that there is an abnormality in the AS subscribed by the user, wherein the ACR[Stop] message includes the information of the abnormal AS.

9. The method according to claim 8, further comprising: acquiring, by a Billing Domain (BD), the CDR of the SCSCF, and performing subsequent processing according to the information of the abnormal AS included in the CDR of the SCSCF.

10. The method according to claim 1, further comprising: acquiring, by a Billing Domain (BD), the CDR of the SCSCF, and performing subsequent processing according to the information of the abnormal AS included in the CDR of the SCSCF.

11. The method according to claim 10, wherein the subsequent processing comprises one or more of the following:
determining whether the abnormal AS is a network element that outputs a user CDR; if the abnormal AS is the network element that outputs the user CDR, applying the CDR of the SCSCF for user charging; and
performing operation and maintenance analysis according to the information of the abnormal AS included in the CDR of the SCSCF.

12. A system for processing an abnormality of an Application Server (AS), comprising: a Serving Call Session Control Function (SCSCF) and a Charging Data Function (CDF), wherein
the SCSCF is configured to send an Accounting Request (ACR) message to the CDF, wherein the ACR message includes an Attribute Value Pair (AVP) configured to indicate information of an abnormal AS; and
the CDF is configured to, after receiving the ACR message, fill a Charging Data Record (CDR) of the SCSCF with the information of the abnormal AS.

13. The system according to claim 12, wherein the AVP is further configured to indicate information of a normal AS.

14. The system according to claim 13, further comprising a Billing Domain (BD) configured to acquire the CDR of the SCSCF, and perform subsequent processing according to the information of the abnormal AS included in the CDR of the SCSCF.

15. The system according to claim 12, wherein the process that the SCSCF sends the ACR message to the CDF comprises one or more of the following:
when a session is started, the SCSCF continues the session and sends an ACR[Start] message to the CDF when the SCSCF determines that there is an abnormality in an AS subscribed by a user, wherein the ACR [Start] message includes the information of the abnormal AS;

when a session is started, the SCSCF terminates the session and sends an ACR[Event] message to the CDF when the SCSCF determines that there is an abnormality in the AS subscribed by the user, wherein the ACR[Event] message includes the information of the abnormal AS;

when a session is in progress, the SCSCF sends an ACR[Interim] message to the CDF when the SCSCF determines that there is an abnormality in the AS subscribed by the user, wherein the ACR[Interim] message includes the information of the abnormal AS; and when a session is terminated, the SCSCF sends an ACR [Stop] message to the CDF when the SCSCF determines that there is an abnormality in the AS subscribed by the user, wherein the ACR[Stop] message includes the information of the abnormal AS.

16. The system according to claim 15, further comprising a Billing Domain (BD) configured to acquire the CDR of the SCSCF, and perform subsequent processing according to the information of the abnormal AS included in the CDR of the SCSCF.

17. The system according to claim 12, further comprising a Billing Domain (BD) configured to acquire the CDR of the SCSCF, and perform subsequent processing according to the information of the abnormal AS included in the CDR of the SCSCF.

18. The system according to claim 17, wherein the subsequent processing comprises one or more of the following:
determine whether the abnormal AS is a network element that outputs a user CDR; if the abnormal AS is the network element that outputs the user CDR, apply the CDR of the SCSCF for user charging; and
perform operation and maintenance analysis according to the information of the abnormal AS included in the CDR of the SCSCF.

* * * * *